United States Patent
Johnson et al.

(10) Patent No.: US 9,286,264 B2
(45) Date of Patent: Mar. 15, 2016

(54) VEHICLE SPEED LIMITER VIA GAUGE INTERFACE

(71) Applicant: Arctic Cat Inc., Thief River Falls, MN (US)

(72) Inventors: Daniel Johnson, Thief River Falls, MN (US); Darrel Janisch, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 115 days.

(21) Appl. No.: 13/829,039

(22) Filed: Mar. 14, 2013

(65) Prior Publication Data
US 2013/0289797 A1    Oct. 31, 2013

Related U.S. Application Data

(63) Continuation-in-part of application No. 13/460,588, filed on Apr. 30, 2012, now Pat. No. 8,818,570.

(51) Int. Cl.
*G05D 1/00* (2006.01)
*G05D 3/00* (2006.01)
(Continued)

(52) U.S. Cl.
CPC ............... *G06F 17/00* (2013.01); *B60W 10/06* (2013.01); *B60W 30/146* (2013.01); *B60K 2031/0091* (2013.01); *B60W 2050/0005* (2013.01); *B60W 2050/0077* (2013.01)

(58) Field of Classification Search
CPC ..... G06F 17/00; B60W 30/146; B60W 10/06; B60W 2050/0077; B60W 2050/0005; B60W 2050/007; B60W 2050/00057; B60R 25/04; B60K 2031/0091

USPC ......................... 701/1, 2, 93, 96, 99
See application file for complete search history.

(56) References Cited

U.S. PATENT DOCUMENTS 4,197,919 A * 4/1980 Redmond .................. 180/269
6,076,037 A * 6/2000 Ono et al. ................. 701/115
(Continued)

FOREIGN PATENT DOCUMENTS

EP    2472010 A1   7/2012
GB    2454273      5/2009
(Continued)

OTHER PUBLICATIONS

McDaniel, George, IBM Dictionary of Computing, book, Aug. 1993, p. 419, McGraw-Hill, Inc., North Carolina.
(Continued)

*Primary Examiner* — Calvin Cheung
*Assistant Examiner* — Paula L Schneider
(74) *Attorney, Agent, or Firm* — Darren J. Jones; Lowe Graham Jones, PLLC

(57) ABSTRACT

An electronic control unit ("ECU") limiter is disclosed. The electronic control unit may be configured to receive a user-specified vehicle limit, such as a speed limit, from an input device, such as a gauge interface of the vehicle or a diagnostic tool. The electronic control unit is further configured to enforce the received vehicle limit, without a need to reprogram (e.g., erase and rewrite) vehicle engine control data stored by the electronic control unit, such as lookup tables or maps that are used to determine the operational parameters (e.g., ignition timing, throttle) based on sensor inputs (e.g., engine revolutions per minute, engine temperature).

22 Claims, 5 Drawing Sheets

(51) Int. Cl.
  *G06F 7/00* (2006.01)
  *G06F 17/00* (2006.01)
  *B60W 30/14* (2006.01)
  *B60W 10/06* (2006.01)
  B60K 31/00 (2006.01)
  B60W 50/00 (2006.01)

(56) References Cited

U.S. PATENT DOCUMENTS

| | | | |
|---|---|---|---|
| 6,356,186 | B1 | 3/2002 | Price et al. |
| 7,222,006 | B2 * | 5/2007 | Proefke et al. ............ 701/29.6 |
| 7,346,439 | B2 | 3/2008 | Bodin |
| 7,363,139 | B2 | 4/2008 | Glora et al. |
| 7,474,943 | B2 | 1/2009 | Matsubara et al. |
| 7,532,962 | B1 | 5/2009 | Lowrey et al. |
| 8,131,605 | B2 | 3/2012 | Donnelli et al. |
| 8,548,710 | B1 | 10/2013 | Reisenberger |
| 8,818,570 | B2 | 8/2014 | Johnson et al. |
| 2002/0170762 | A1 * | 11/2002 | Daneshmand ............ 180/178 |
| 2005/0154511 | A1 | 7/2005 | Proefke et al. |
| 2006/0076742 | A1 | 4/2006 | Scholl |
| 2007/0055424 | A1 | 3/2007 | Peters et al. |
| 2007/0067590 | A1 * | 3/2007 | Savagaonkar et al. ........ 711/163 |
| 2007/0239331 | A1 | 10/2007 | Kaplan |
| 2008/0223646 | A1 | 9/2008 | White et al. |
| 2009/0111652 | A1 | 4/2009 | Reedy et al. |
| 2011/0132679 | A1 | 6/2011 | Kerner et al. |
| 2012/0065862 | A1 * | 3/2012 | Fiske et al. ............ 701/93 |
| 2012/0197465 | A1 * | 8/2012 | Gotou et al. ............ 701/2 |
| 2012/0253552 | A1 * | 10/2012 | Skelton ............ 701/2 |
| 2013/0018567 | A1 * | 1/2013 | Lim et al. ............ 701/102 |
| 2013/0289799 | A1 | 10/2013 | Johnson et al. |

FOREIGN PATENT DOCUMENTS

| | | |
|---|---|---|
| GB | 2454273 A | 5/2009 |
| WO | 0222407 A1 | 3/2002 |
| WO | WO0222407 | 3/2002 |

OTHER PUBLICATIONS

Microsoft Press, Computer Dictionary, book, 1997, p. 170, Microsoft Press, Redmond, Washington.

Mask ROM, encyclopedia, 2014, Wikipedia, United States of America.

WO2014159117 Electronic Control Unit for Limitingat Least One Vehicle Parameter, Corresponding Method and Storage Medium Storing Corresponding Instructions; Written Opinion of the International Search Authority; Sep. 14, 2015; WIPO Patentscope.

* cited by examiner

VEHICLE SPEED LIMITER VIA GAUGE INTERFACE

PRIORITY CLAIM

This application is a continuation-in-part of U.S. patent application Ser. No. 13/460,588, filed Apr. 30, 2012, the contents of which are incorporated herein by reference in their entirety.

FIELD OF INVENTION

This invention relates generally to a vehicle electronic control unit ("ECU") limiter that is configurable via a gauge interface or other input device, such as a diagnostic tool, without needing to reprogram the ECU.

BACKGROUND OF THE INVENTION

Recreational vehicles, such as all-terrain vehicles ("ATVs"), recreational off-road vehicles ("ROVs"), and other similar equipment usually represent a significant purchase. As such, buyers enjoy testing a vehicle before purchasing in an environment similar to the one in which they will use the vehicle. The buyer may wish to test the vehicle under actual conditions such as at full throttle, full speed, etc. However, the dealer, manufacturer, and consumer have an interest in selling the vehicle and having it registered for warranty purposes. Thus, once the vehicle is sold to a consumer, the testing comes to a close and the vehicle is registered and warranty coverage starts for the new owner. There is a need in the art for a system and/or method of controlling the usage of a vehicle or other equipment after purchase that ensures that the vehicle is covered by warranty from the manufacturer but that still allows the vehicle to be tested before purchase under real conditions.

In addition, vehicle users or owners at times have a need to limit the usage of a vehicle. For example, due to safety, liability, and/or insurance-related concerns, a company having a fleet of ATVs for use by its employees may wish to limit the speed at which the ATVs can be driven. As another example, an owner of an ATV may wish to limit the speed at which a child, youth, or guest can drive the ATV. After the guest has finished driving the ATV, the owner will typically want to remove any established limit, or set a different limit, depending on the next user.

The existing approach to setting such vehicle limits requires reprogramming the electronic control unit of the vehicle. Reprogramming a vehicle ECU is a complex operation, requiring special purpose software, hardware, connectors, and the like. Reprogramming an ECU also requires technical knowledge beyond that which is possessed by typical consumers. If reprogramming is performed incorrectly, the vehicle may become inoperable or unsafe. Due to the attendant complexities, reprogramming an ECU is an operation that is primarily performed by repair shops, dealers, and/or manufacturers. It is thus impracticable for a vehicle owner to reprogram the vehicle ECU every time he wishes to set or adjust a vehicle limit.

SUMMARY OF THE INVENTION

The present invention is directed to an enhanced electronic control unit for a vehicle. The electronic control unit is configured to receive a user-specified vehicle limit, such as a speed limit, from an input device, such as a gauge interface of the vehicle or a diagnostic tool. The electronic control unit is further configured to enforce the received vehicle limit, without a need to reprogram (e.g., erase and rewrite) vehicle control data stored by the electronic control unit, such as lookup tables or maps that are used to determine the operational parameters (e.g., ignition timing, throttle) based on sensor inputs (e.g., engine revolutions per minute, engine temperature).

Other embodiments provide a method in an electronic control unit for limiting operation of a vehicle without reprogramming the electronic control unit. The method comprises receiving an indication of a maximum speed, such as from a gauge interface of the vehicle. The method also comprises determining, based on the maximum speed, one or more operational parameters. The method further comprises, limiting operation of the vehicle based on the determined operational parameters.

Further embodiments provide a computer-readable medium that includes instructions that are configured, when executed by an electronic control unit, to perform the above method or similar.

The invention also entails imposing vehicle operational limits based on safety factors, such as identity of a driver or passenger or use of safety equipment, such as seat belts.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

The present disclosure is directed to an electronic control unit ("ECU", sometimes also called an "engine control unit") configured to limit operation of a vehicle. The present disclosure can be used with vehicles or with other equipment such as appliances, heavy machinery, or any other suitable equipment. For purposes of explanation, however, the present disclosure will reference vehicles for conciseness and to avoid obscuring aspects of the present disclosure.

In a first embodiment, described with respect to FIGS. 1-3 below, the ECU can monitor a vehicle parameter, such as engine operation time, fuel consumption, speed, or distance travelled, and if the parameter exceeds a certain limit, the vehicle is permitted to operate only in a limited capacity. In one embodiment, the ECU will continue to limit the operation of the vehicle until an unlocking code is entered. For example, a vehicle can be operated by a dealer and by potential customers for a certain time (e.g., 5 engine hours) before the ECU initiates operation limits. After reaching the prescribed parameter limit, the ECU limits operation of the vehicle to within certain prescribed parameters, such as by limiting the engine speed (RPM) or the ground speed of the vehicle, or any other suitable parameter.

In another embodiment, described with respect to FIGS. 4-7 below, the ECU is configured to receive limit data, such as a maximum speed, that is entered by a user via an input device, such as a gauge interface, diagnostic tool, or the like. This user-supplied limit data is persistently stored by the ECU without reprogramming (also referred to as "reflashing") previously stored engine control data in the ECU. Engine control data typically includes factory-supplied maps, tables, calibration data, and the like, that is used by the limiter or other components of the ECU to adjust, control, or limit the operation of the engine and other systems of the vehicle. The ECU then determines vehicle limits based on both the user-supplied limit data as well as the engine control data. In some embodiments, the user-supplied limit data and the engine control data are stored in different memories in the ECU, such that the limit data may be stored without disturbing, rewriting, or otherwise modifying any engine control data.

Figure 1:
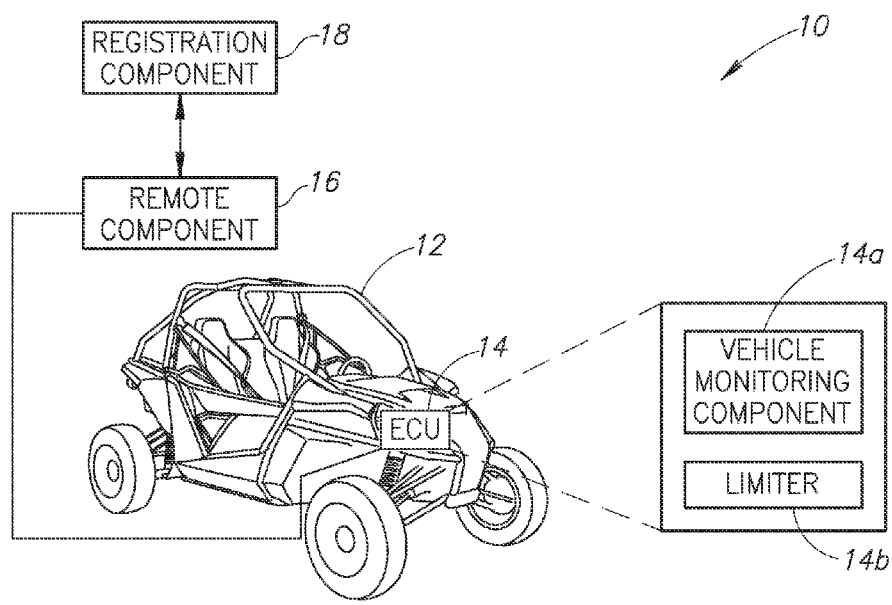
FIG. 1 is a schematic diagram illustrating an ROV having an electronic vehicle limiter system according to a first embodiment of the present invention.

FIG. 1 is a schematic illustration of an ECU system 10 according to a first embodiment of the present disclosure. The system 10 can include a vehicle 12, an ECU 14, a remote component 16, and a registration component 18. The vehicle 12 can be any suitable vehicle, such as a recreational off-road vehicle ("ORV"), a snowmobile, a motorcycle, an automobile, or any other equipment. The ECU 14 can comprise a vehicle monitoring component 14a and a limiter 14b. The ECU 14 can be part of the main ECU of the vehicle or can be built directly into a gauge of the vehicle. The ECU 14, for purposes of this invention, can be anything with a processor to control or influence a vehicle parameter, such as fuel use, rpm, etc. The ECU may be coupled with the main control unit of the vehicle or may be separate. The vehicle monitoring component 14a can be operably coupled to systems of the vehicle 12, such as the fuel injection system, the exhaust system, the electronic system, the drive train, the internal instruments of the vehicle, or any other suitable vehicle system. The vehicle monitoring component 14a can monitor vehicle parameters of these vehicle systems using any suitable sensing mechanism. The vehicle monitoring component 14a can monitor a multitude of measurable vehicle parameters, such as a location of the vehicle, fuel consumption, fuel type used, exhaust parameters, power output, speed, acceleration, identity of a driver or passenger, the use of safety equipment such as seat belts, a load on the vehicle, distance traveled, or terrain type.

The limiter 14b can be operably coupled to the vehicle monitoring component 14a to send and/or receive instructions to/from the vehicle monitoring component 14a. The limiter 14b can also be coupled to vehicle systems in a manner that permits the limiter 14b to influence the vehicle systems. For example, the limiter 14b can be coupled to an electronic fuel injection system of the vehicle 10 to limit fuel injection parameters to limit the vehicle 10 as needed. The limiter 14b can be coupled to any suitable vehicle system, such as the fuel system, the exhaust system, engine parameters (e.g., speed, position, or rpm of various components), or any other suitable vehicle system. The limiter 14b can limit operation of the vehicle 10 to within a prescribed limit according to the vehicle monitoring component 14a. For example, the limiter 14b can prevent the engine from starting, limit RPMs of the engine, limit the top speed of the vehicle, limit load on the engine, limit the distance the vehicle is permitted to travel, limit the power or torque output of the vehicle, limit the fuel consumed by the vehicle, or any other suitable vehicle operation limit.

The remote component 16 can communicate with the ECU 14 to direct the ECU 14 to place limits on the vehicle 12 or to withdraw the limits. The remote component 16 can be an electronic unit that can plug into the vehicle 12 or into the ECU 14 directly to operate the ECU 14, such as a diagnostic tool or another suitable electronic device. In some embodiments, the remote component 16 can communicate with the ECU 14 (or a selected component thereof) wirelessly using a controller area network ("CAN"), Wi-Fi, BLUETOOTH™ or another suitable wireless communication protocol. The remote component 16 can communicate with a registration component 18 to record information regarding the status of the vehicle 10 and of the ECU 14. In an example, the registration component 18 can be a server or another computing unit that can store registration information for the vehicle 12. The registration component 18 can store registration information such as purchaser name, address, financing, contact information, etc. The remote component 16 can be operated by a dealership where the vehicle 12 is sold. The ECU 14 can be programmed to permit the vehicle 12 to operate without limitations for an initial period, such as 5 engine hours, or 50 miles, or any other suitable initial period. This permits the dealer to demonstrate the vehicle 12 to customers without limitation. After the initial period, however, the ECU 14 will trigger the operation limits to encourage the dealer and/or purchaser to register the vehicle 12 with the registration component 18. In some embodiments, the ECU 14 can delay the limits until a current trip is over to avoid causing the vehicle to become stranded. For example, if the limiter is configured to prevent the vehicle 12 from operating at all, the ECU 14 can be programmed with a grace period so that if a purchaser is out on a test ride, the vehicle 12 will not simply shut down immediately. Rather, the vehicle 12 can display a warning that the time has passed, and that the vehicle 12 should now return to the dealership or be properly registered. After a certain time, however, the limitations can escalate to prevent a user from skirting the protections of the ECU 14 by simply running the vehicle 12 indefinitely.

The limiter 14b can institute a series of limits that can escalate in intensity as the engine time is progressively exceeded by greater and greater margins. For example, the limiter 14b may first issue a notification only, with no actual limit placed on the operation of the vehicle. Then, if the vehicle 12 is not registered and the ECU 14 is not properly deactivated, the limiter 14b can limit the RPMs slightly. If still more time passes without the ECU 14 being properly deactivated, the limiter 14b can more severely limit the vehicle 12.

Each vehicle 12 can have a unique identifier that can be sent to the registration component 18. In response, the registration component 18 can deliver an unlock code to the remote component 16. Once registration is complete, the unlocking code can be entered into the ECU 14 to remove the vehicle limitations. In some embodiment, the registration component 18 can be a web server that can be accessed through a standard web browser that can receive the vehicle identification credentials and can respond with an unlocking code for the ECU 14. A diagnostic tool can be used to remove the vehicle limitations. The system 10 therefore encourages proper registration of the vehicle 10 to prevent warranty fraud and theft.

Figure 2:
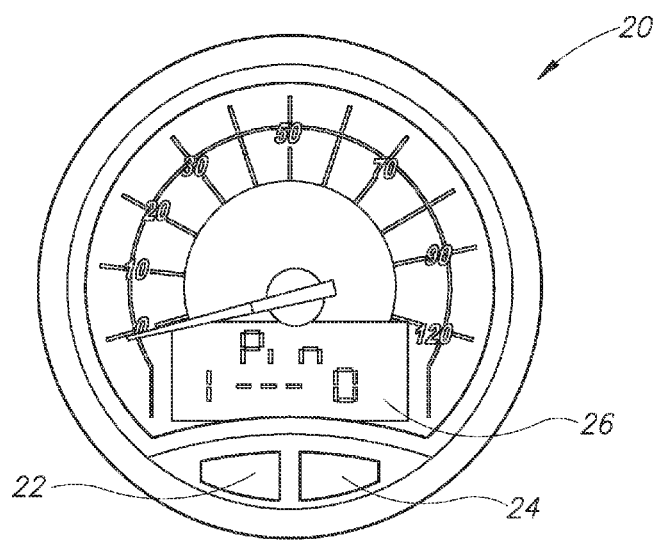
FIG. 2 is an illustration of a vehicle gauge and display screen of the electronic vehicle limiter according to the first embodiment of the present invention.

FIG. 2 illustrates a gauge interface 20 of a vehicle according to the first embodiment of the present disclosure. The gauge interface 20 can include a first button 22, a second button 24, and an electronic display 26. In some embodiments, the display 26 can show an error code when the limiter is engaged. The error code can be verbose and spell out in prose that the vehicle has a limiter that has been engaged because the vehicle has not been registered properly. Or, the display 26 can show a numeric code that is correlated with a message describing the limiter and the circumstances that is included with documentation such as an owner's manual. The buttons 22, 24 can be used to input the unlock code. Virtually any other type of input mechanism or user interface can be used to input the unlock code to the vehicle.

Figure 3:
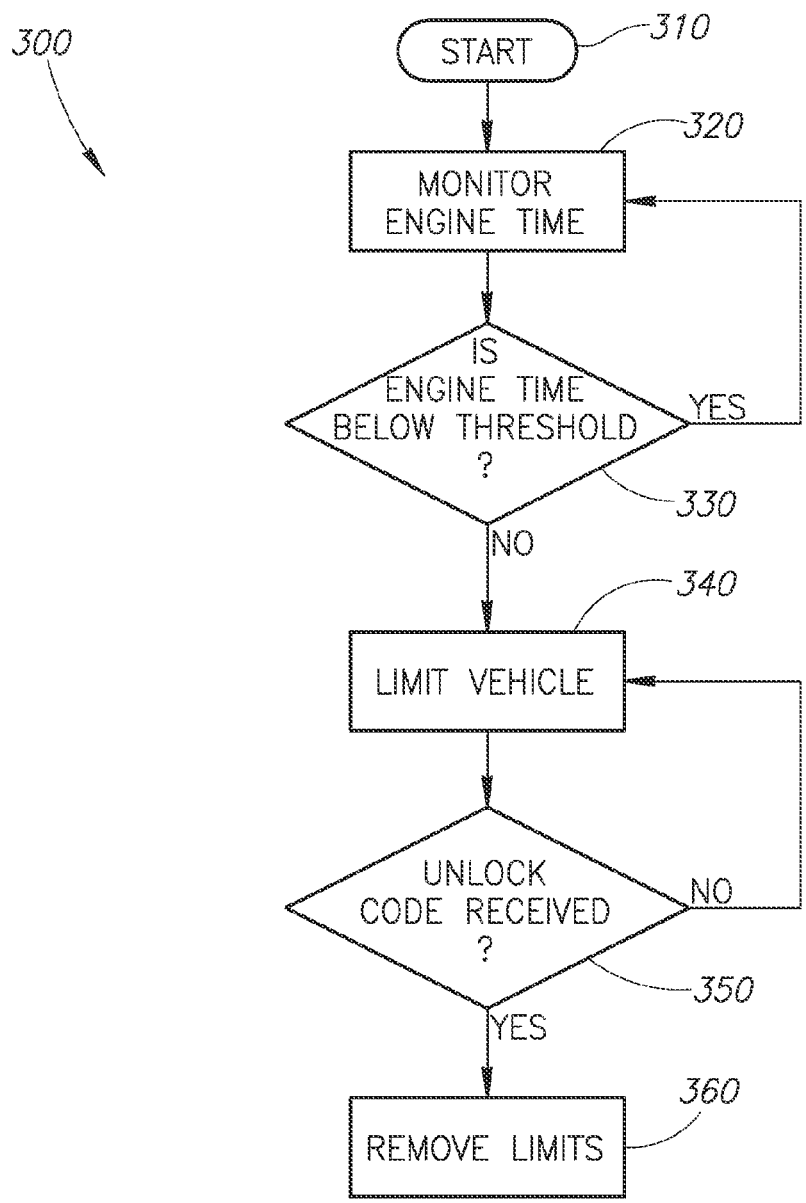
FIG. 3 is a flow diagram of a method of selectively limiting operation of a vehicle according to the first embodiment of the present invention.

FIG. 3 is a flow chart of a method 300 of selectively limiting a vehicle according to the first embodiment of the present invention. The method begins at step 310, after which the method includes monitoring engine time 320. This can be achieved with a vehicle monitoring component 14a as described above. In other embodiments, this step can include monitoring any other suitable parameter including those listed elsewhere herein. At step 330, the method includes checking whether or not the engine time has exceeded a predetermined threshold. The threshold can be any arbitrary time period, such as 5 engine hours, 10 engine hours, etc. The threshold can be an absolute time threshold independent of engine status. The check in this step relates to the parameter monitored in step 320. In other embodiments in which the parameter monitored at step 320 is something other than engine time, the check at step 330 can check for that parameter. For example, if the parameter of step 320 is to monitor fuel consumption, then the check in step 330 can be whether or not the fuel consumption has exceeded a predetermined threshold limit.

If the check at step 330 is affirmative, control passes back to step 320 to continue monitoring. In other embodiments, the method can cease after this step if a one-time check is desired. If the check is negative, meaning that the engine time threshold has been exceeded, the method includes limiting the vehicle at step 340. The limit placed on the vehicle can be any suitable limit including those described elsewhere herein, such as a vehicle speed limit, engine operation limit, travel distance limit, fuel consumption limit, or any other suitable limit.

In some embodiments, the method can include multiple checks similar to the check at step 330. Each check can have a corresponding threshold and a similarly corresponding limit to impose. These checks and limits can be executed independently, or in series. For example, two independent checks can be performed on fuel consumption and engine time. These parameters may be related, but are generally independent. The limit imposed by exceeding either of these thresholds can be the same limit, or can be separate independent limits. For example, the limit imposed by exceeding the engine time limit may be preventing the engine to run, and the limit imposed by exceeding the fuel consumption limit may be something different, such as a speed limit. The severity of the limit imposed can be increased as each threshold is exceeded. In some embodiments, for example, for each monitored parameter in which a prescribed threshold is exceeded, the speed of the vehicle can be limited to a greater degree, such as 60 mph for the first threshold, 50 mph for the second, 40 for the third, and so on.

The method can further include a periodic check of whether or not an unlock code has been received at step 350. If the unlock code has not been received, the limits continue at step 340. When the unlock code is received, the limits can be removed at step 360. There may be multiple unlock codes for each vehicle, each of which can unlock all or part of the limits placed on the vehicle.

Figure 4:
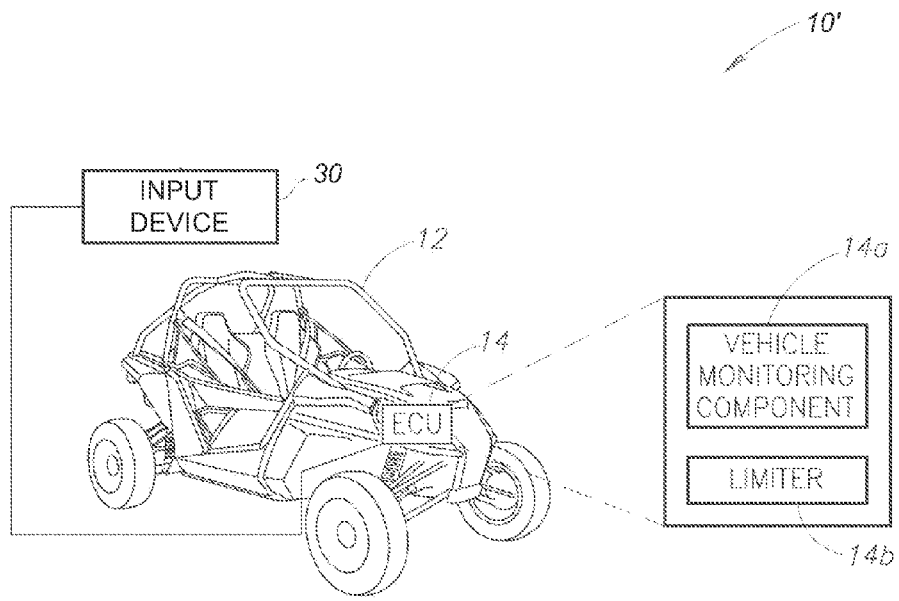
FIG. 4 is a schematic diagram illustrating an ROV having an electronic vehicle limiter system according to a second embodiment of the present invention.

FIG. 4 is a schematic diagram illustrating an ROV having an electronic vehicle limiter system according to a second embodiment of the present invention. In particular, FIG. 4 depicts an ECU system 10' that is similar to the system 10 described with respect to FIG. 1. The illustrated system 10' includes a vehicle 12 and an ECU 14. The ECU 14 includes a vehicle-monitoring component 14a and a limiter 14b. The vehicle 12, ECU 14, monitoring component 14a, and limiter 14b are described with respect to FIG. 1.

The system 10' differs from the system 10 of FIG. 1 primarily in that the ECU 14 is in communication with an input device 30 rather than the remote component 16. In addition, system 10' does not necessarily include the registration component 18, although in other alternate embodiments the system 10' may be in communication with other systems or devices. The input device 30 may be any device that is configured to receive limit data from a user or other source, and to communicate that limit data to the ECU 14 for storage. The input device 30 may be or include a gauge interface mounted on or in the vehicle 12, a diagnostic tool, a computing device (e.g., a smart phone, laptop computer), or the like. An example gauge interface is described with respect to FIG. 5, below.

A user operates the input device 30 to provide limit data, such as a maximum speed limit. The limit data is then transmitted by the input device 30 to the ECU 14, where it is stored. As noted above, the received limit data is stored without reflashing the ECU 14, that is, without overwriting previously stored engine control data, such as maps, tables, calibration data/constants, and the like. The limit data is typically stored persistently, such that it functions to impose vehicle limits during subsequent operation after the vehicle 12 has been powered down.

When the vehicle 12 is in operation, the limiter 14b determines vehicle limits based on previously stored engine control data and user-supplied limit data. For example, suppose that a user provided a maximum speed limit of 30 miles per hour. The limiter 14b may determine a first limit of 60 miles per hour that is based on the engine control data in conjunction with vehicle parameters (e.g., rpm, temperature) monitored by the vehicle monitoring component 14a. Then, the limiter 14b will cap the first limit to 30 miles per hour, given the presence of the user-provided maximum. This limit of 30 miles per hour will then be used by the limiter 14b to control the speed of the vehicle 12, such as by reducing the amount of fuel delivered to the engine.

Note that although a maximum speed limit is frequently used herein to provide an example of operation, other limits may be established in other embodiments. For example, other embodiments may allow a user to specify a maximum engine revolutions per minute, a maximum engine temperature, or the like. Other embodiments may allow a user to establish geographic limits, such as by specifying a maximum distance traveled, by specifying a geographic region (e.g., via a set of GPS coordinates or an interactive map), or the like. Limits may be combined and/or progressive. For example, a user may specify a first limit to use within a first region (e.g., on the user's property) along with a second limit to use within a second region (e.g., off the user's property). In some embodiments, limits may be set to automatically time out or expire.

Figure 5:
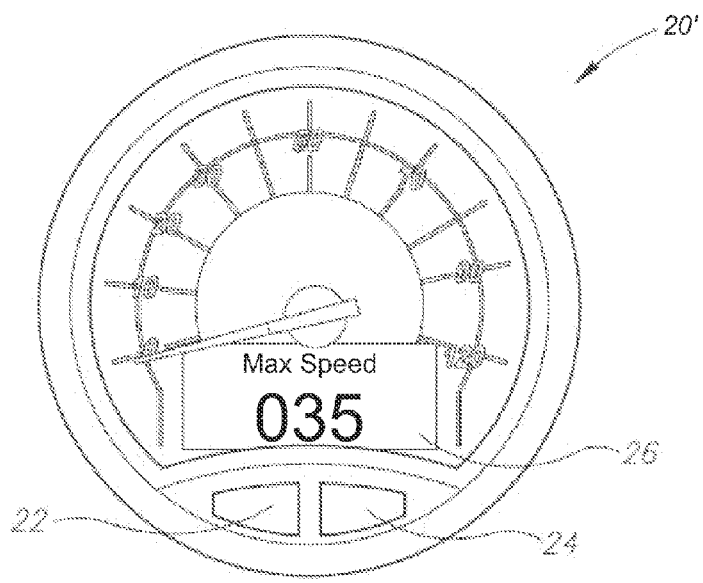
FIG. 5 is an illustration of a vehicle gauge and display screen of the electronic vehicle limiter according to the second embodiment of the present invention.

FIG. 5 is an illustration of a vehicle gauge and display screen of the electronic vehicle limiter according to the second embodiment of the present invention. FIG. 5 illustrates a gauge interface 20' that is similar to that described with respect to FIG. 2. The illustrated gauge interface 20' is an example of the input device 30 described with respect to FIG. 4. The gauge interface 20' includes a first button 22, a second button 24, and an electronic display 26. A user can operate the buttons 22 and 24 to input limit data, such as a maximum speed. The display 26 presents information about received limit data. In this example, the display 26 is showing a maximum speed of 35 miles per hour, as input by the user operating buttons 22 and 24.

One embodiment may include a security mechanism. For example, the ECU 14 may be configured to require a password, personal identification number ("PIN"), or other access code in order to view, modify, or otherwise access limit data stored by the ECU 14. For example, when the user wishes to set or view the current speed limit, he may first be required to enter his access code via the gauge interface 20'. The ECU 14 then determines whether the provided access code matches a previously established access code, and if so, allows the user to proceed to set or view the current speed limit.

Figure 6:
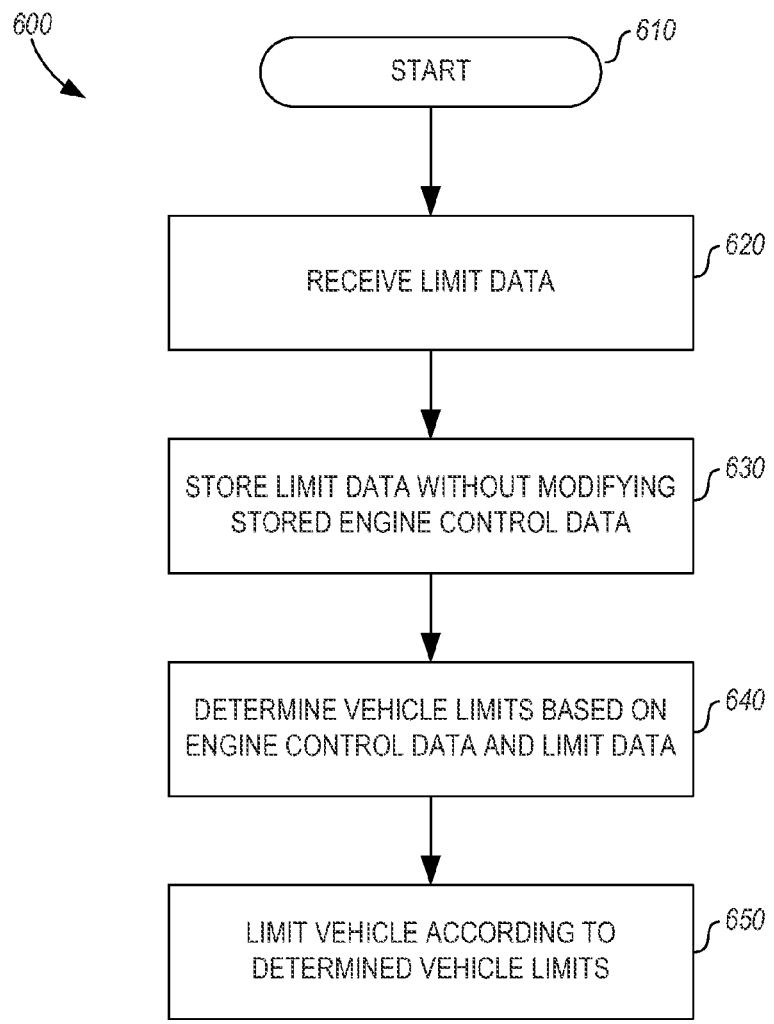
FIG. 6 is a flow diagram of a method of selectively limiting operation of a vehicle according to the second embodiment the present invention.

FIG. 6 is a flow diagram of a method of selectively limiting operation of a vehicle according to the second embodiment the present invention. The method begins at step 610. At step 620, the method receives limit data. Receiving limit data may include receiving an indication of a maximum speed or other limit value from an input device, such as the vehicle gauge, diagnostic tool, or the like. In some embodiments, the method also determines whether the user is authorized to provide limit data, such as by challenging the user to provide an access code, and determining whether the correct access code has been supplied.

At step 630, the method stores the received limit data without modifying stored engine control data. Storing the received limit data may include persistently storing the limit data in a different memory (or different memory region) of the ECU than is used to store the engine control data. For example, the limit data may be stored in an EEPROM ("Electrically Erasable Programmable Read Only Memory"), whereas the engine control data may be stored in a ROM ("Read Only Memory") or an EPROM ("Erasable Programmable Read Only Memory"). Thus, the received limit data can be stored without performing a reflash of the entire ECU and/or its engine control data.

At step 640, the method determines vehicle limits based on engine control data and the received limit data. Determining vehicle limits may include first determining a limit without considering the received limit data. For example, the method may determine a first limit (if any) with reference to the engine control data (e.g., a lookup table) and current operational parameters (e.g., temperature, RPM, etc.). Then, the determined current limit may be modified (e.g., adjusted downward) based on the received limit data, such as by taking the minimum of the user-provided limit value (e.g., 30 miles per hour) and the determined first limit.

At step 650, the method limits the vehicle operation according to the determined vehicle limits. Limiting the vehicle may include any suitable limit including vehicle speed limit, engine operation limit, travel distance limit, fuel consumption limit, or the like. Limiting the vehicle may include transmitting signals to actuators or other devices that control fuel flow, air flow, engine timing, and the like.

Figure 7:
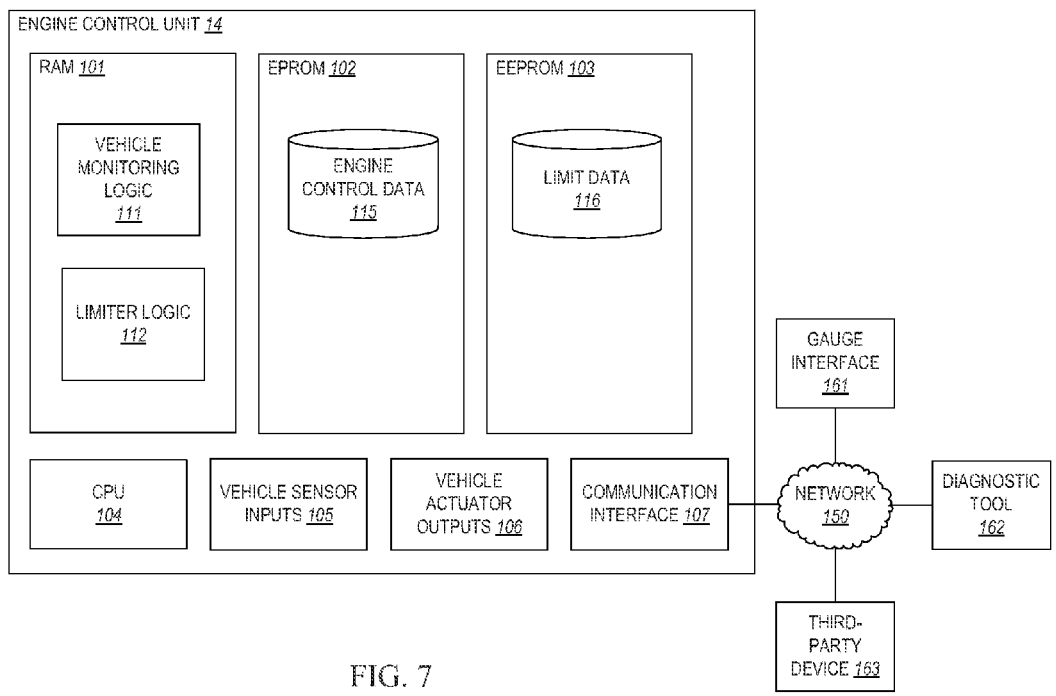
FIG. 7 is a block diagram of an electronic control unit according to the second embodiment of the present invention.

FIG. 7 is a block diagram of an electronic control unit according to the second embodiment of the present invention. In the embodiment shown, the electronic control unit 14 comprises multiple memories, including a Random Access Memory ("RAM") 101, an Erasable Programmable Read Only Memory ("EPROM") 102, and an Electrically Erasable Programmable Read Only Memory ("EEPROM") 103. The ECU 14 further includes a Central Processing Unit ("CPU") 104, vehicle sensor inputs 105, vehicle actuator outputs 106, and a communication interface 107.

The communication interface 107 is communicatively coupled to a network 150. In one embodiment, the network 150 is a controller area network ("CAN") resident within the vehicle 12 and configured to interconnect various devices and components of the vehicle, including sensors, actuators, and the like. In general, the network 150 may be any combination of one or more media (e.g., twisted pair, coaxial, fiber optic, radio frequency), hardware (e.g., routers, switches, repeaters, transceivers), and one or more protocols (e.g., RS-232, TCP/IP, UDP, Ethernet, Wi-Fi) that facilitate communication between remotely situated humans and/or devices. In some embodiments, the network 150 may be or include multiple distinct communication channels or mechanisms (e.g., cable-based and wireless).

The ECU 14 and its components communicate via the network 150 with one or more of a gauge interface 161, a diagnostic tool 162, and a third-party device 163. The devices 161-163 are examples of the input device 30 described with respect to FIG. 4. The third-party device 163 may be any device that is configured to provide limit data to the ECU 14, including a smart phone, a tablet computer, a remote memory device, or the like. In typical embodiments, one or more of the devices 161-163 may not be present at a given time. For example, when the vehicle is in operation in the field, only the gauge interface 161 will typically be present.

The RAM 101 stores vehicle monitoring logic 111 and limiter logic 112. The monitoring logic 111 and limiter logic 112 respectively implement the vehicle monitoring component 14a and limiter 14b. The logic 111 and 112 include instructions for execution on the CPU 104. Copies of the logic 111 and 112 are typically also persistently stored in the EPROM 102 and/or the EEPROM 103 and loaded into the RAM 101 upon power up of the ECU 14. Note that other code modules (e.g., a data logger, a networking stack) may also reside in the RAM 101, and execute on the CPU 104. In some embodiments, the logic 111 and 112 (and/or other logic) may instead be stored and executed directly from a ROM or other type of memory.

The EPROM 102 stores engine control data 115. The engine control data 115 includes tables, maps, or other data that is used by the limiter logic 112 to adjust, control, and limit the operation of the vehicle. The tables or maps are used by the limiter logic 112 to look up operational parameters based on input conditions. For example, one table may map engine revolutions per minute to ignition timing parameters. An EPROM is a type of non-volatile memory that is reprogrammed by erasing and rewriting the entire contents of the memory. In some types of EPROM, the reprogramming process requires an exposure to an ultraviolet light emitted by a reprogramming device. These types of EPROM are thus typically removed from their equipment for reprogramming. The EPROM 102 may thus be installed at the factory, and reprogrammed only by a party in possession of a reprogramming device.

The EEPROM 103 stores limit data 116. The limit data 116 includes user-supplied limit values received from one of the devices 161-163. An EEPROM is a type of non-volatile memory that can be erased or rewritten by application of electrical current. EEPROMs differ from EPROMs in that the entire EEPROM need not be erased and rewritten when storing data. Depending on the type of EEPROM, it may be modifiable at a byte- or word-level (e.g., a single byte or word can be erased and rewritten) or block- or page-level (e.g., an entire memory page must be stored at one time). Flash memory is a type of EEPROM that is programmable at the block/page level rather than the byte/word level. By storing the limit data 116 in the EEPROM 103, the ECU 14 can efficiently store the typically small amount of data that represents a received limit (e.g., one byte may be used to store a speed limit) without needing to undertake a complicated reprogramming operation, such as would be required for modifying the contents of the EPROM 102.

Note that other memory architectures may be employed. For example, in some embodiments, the engine control data 115 may also be stored in a region of the EEPROM 103 that is distinct from the limit data 116, such that modifications to the limit data 116 do not impact the contents of the engine control data 115. In other embodiments, the engine control data 115 may be stored in a page/block-level EEPROM (e.g., a flash memory), whereas the limit data 116 in a byte/word-level EEPROM.

In an example embodiment, the logic modules of the ECU 14 are implemented using standard programming techniques. For example, the logic 111 and 112 may be implemented as a "native" executable code running on the CPU 104, possibly along with one or more static or dynamic libraries. In general, a range of programming languages known in the art may be employed for implementing such example embodiments.

In general, the logic modules of the ECU 14 may be implemented in software, firmware, or in some combination thereof. In certain embodiments, some or all of the components of the ECU 14 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored in a non-transitory manner on tangible, non-transitory storage mediums. Such computer program products may also take other forms in other embodiments. Accordingly, embodiments of this disclosure may be practiced with other computer system configurations.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A control unit for a vehicle, comprising:
   an electronic control unit containing:
      a first memory that is reprogrammable and that stores engine control data including lookup tables that are used to determine operational parameters;
      a second memory that is distinct from the first memory and that stores an indication of a maximum speed; and
      a limiter module configured to limit operation of the vehicle without reprogramming the first memory, by:
         receiving the indication of the maximum speed;
         determining, based on the maximum speed and the engine control data stored in the first memory, one or more operational parameters; and
         limiting operation of the vehicle based on the determined operational parameters,
      wherein receiving the indication of the vehicle limit includes: receiving a user-specified indication of a maximum speed for the vehicle;
      wherein the vehicle includes a controller area network coupled to a gauge interface, and wherein receiving the user-specified indication of a maximum speed for the vehicle includes:
         receiving, via the controller area network, the indication from the gauge interface of the vehicle.

2. The control unit of claim 1, wherein the limiter module limits operation of the vehicle without reprogramming the first memory by:
   storing the indication of the maximum speed in the second memory, while leaving unmodified the contents of the first memory.

3. The control unit of claim 1, wherein the first memory is an erasable programmable read only memory, and wherein the limiter module limits operation of the vehicle without reprogramming the first memory by:
   limiting operation of the vehicle without erasing or replacing the erasable programmable read only memory.

4. The control unit of claim 1, wherein the first memory is an erasable programmable read only memory, and wherein the second memory is an electrically erasable programmable read only memory.

5. The control unit of claim 1, wherein the first memory is modifiable at a page level, and wherein the second memory is modifiable at a word level.

6. The control unit of claim 1, wherein the gauge interface includes a display and one or more keys.

7. The control unit of claim 1, wherein receiving the indication of the maximum speed includes:
   receiving the indication of the maximum speed from a controller area network of the vehicle, the controller area network communicatively coupled to the electronic control unit.

8. The control unit of claim 1, wherein determining, based on the maximum speed and the engine control data stored in the first memory, one or more operational parameters includes:
   accessing a lookup table of the engine control data to determine a maximum speed parameter; and
   modifying the maximum speed parameter when it exceeds the received indication of the maximum speed.

9. The control unit of claim 1, configured to determine whether a user is authorized to set a vehicle limit by:
   receiving an access code; and
   determining the operational parameters only when the received access code matches a previously specified access code stored by the electronic control unit.

10. A method in an electronic control unit of a vehicle, the electronic control unit including a first memory that is reprogrammable and that stores engine control data including lookup tables that are used to determine operational parameters, the method comprising:
   limiting, by the electronic control unit, operation of the vehicle without reprogramming the first memory, by:
      receiving an indication of a vehicle limit;
      storing the indication of the vehicle limit in a second memory that is an electrically erasable programmable read only memory;

determining, based on the indication of the vehicle limit stored in the second memory and the engine control data stored in the first memory, one or more operational parameters; and limiting operation of the vehicle based on the determined operational parameters, wherein receiving the indication of the vehicle limit includes: receiving a user-specified indication of a maximum speed for the vehicle;

wherein the vehicle includes a controller area network coupled to a gauge interface, and wherein receiving the user-specified indication of a maximum speed for the vehicle includes:

receiving, via the controller area network, the indication from the gauge interface of the vehicle.

11. The method of claim 10, wherein determining, based on the indication of the vehicle limit and the engine control data stored in the first memory, one or more operational parameters includes:

accessing a lookup table of the engine control data to determine a maximum speed parameter;

when the maximum speed parameter is greater than the indicated maximum speed, outputting the indicated maximum speed, otherwise outputting the maximum speed parameter.

12. The method of claim 10, wherein the electrically erasable programmable read only memory is part of the electronic control unit, and wherein limiting operation of the vehicle includes:

performing a byte- or word-level storage operation of the electrically erasable programmable read only memory to record the indication of the vehicle limit in the electrically erasable programmable read only memory.

13. The method of claim 10, wherein limiting operation of the vehicle includes:

storing the indication of the vehicle limit in a flash memory that supports page-level storage operations.

14. The method of claim 10, wherein at least one of the operational parameters includes a safety indication.

15. The method of claim 14, wherein the safety indication relates to the identity of the driver.

16. The method of claim 14, wherein the safety indication relates to whether one or more seat belts are secured.

17. A non-transitory computer-readable storage medium including instructions that are configured, when executed by a processor of an electronic control unit of a vehicle, to cause the electronic control unit to perform a method comprising;

limiting operation of the vehicle without reprogramming the electronic control unit, wherein the electronic control unit includes:

a first memory that is reprogrammable and that stores engine control data;

a second memory that is distinct from the first memory and that stores an indication of a maximum speed, wherein limiting operation of the vehicle includes:

receiving an indication of a vehicle limit;

determining, based on the indication of the vehicle limit and an engine control lookup table stored in a first memory of the electronic control unit, one or more operational parameters; and limiting operation of the vehicle based on the determined operational parameters, wherein receiving the indication of the vehicle limit includes: receiving a user-specified indication of a maximum speed for the vehicle;

wherein the vehicle includes a controller area network coupled to a gauge interface, and wherein receiving the user-specified indication of a maximum speed for the vehicle includes:

receiving, via the controller area network, the indication from the gauge interface of the vehicle.

18. The computer-readable storage medium of claim 17, wherein limiting operation of the vehicle without reprogramming the electronic control unit includes:

storing the received indication of the vehicle limit without modifying the engine control lookup table;

receiving, via the gauge interface of the vehicle, a user-specified indication of a maximum engine revolutions per minute; and ensuring that the engine of the vehicle does not exceed the maximum engine revolutions per minute.

19. An electronic control unit system for a vehicle, comprising:

a first memory that is reprogrammable and that stores engine control data including lookup tables that are used to determine operational parameters;

a second memory that is distinct from the first memory and that stores an indication of a maximum speed;

a vehicle monitoring component configured to monitor at least one vehicle parameter of the vehicle; and a limiter operably coupled to the vehicle monitoring component and configured to place limits, without reprogramming the first memory, on operation of the vehicle when the vehicle monitoring component detects at least one parameter beyond a predetermined threshold, wherein the electronic control unit is configured to receive an instruction to apply a limit, wherein the vehicle includes a controller area network coupled to a gauge interface, and wherein the electronic control unit receives a user-specified indication of a maximum speed for the vehicle by receiving, via the controller area network, the indication from the gauge interface of the vehicle.

20. The electronic control unit of claim 19, wherein the threshold is a safety threshold, and the limiter applies a limit to vehicle performance once the threshold is met.

21. The electronic control unit of claim 20, wherein the threshold is a driver identity, the limiter applies a limit to the vehicle performance if the driver is identified with a preselected profile.

22. The electronic control unit of claim 20, wherein the threshold is a seat belt securement switch, the vehicle being limited in performance if the belt is not secured.

* * * * *